US006963663B1

(12) United States Patent
Yoshida

(10) Patent No.: US 6,963,663 B1
(45) Date of Patent: Nov. 8, 2005

(54) IMAGE PROCESSING FOR IMAGE CORRECTION

(75) Inventor: Hiroki Yoshida, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 636 days.

(21) Appl. No.: 09/605,637

(22) Filed: Jun. 28, 2000

(30) Foreign Application Priority Data

Jun. 29, 1999 (JP) ................................ 11-183444

(51) Int. Cl.[7] ............................................ G06K 9/00
(52) U.S. Cl. ...................................... 382/167; 382/118
(58) Field of Search ....... 382/117–118, 162–167; 358/500–540; 395/592–600

(56) References Cited

U.S. PATENT DOCUMENTS

| | | | | |
|---|---|---|---|---|
| 5,075,788 A | * | 12/1991 | Funda | ........................ 358/462 |
| 5,309,228 A | * | 5/1994 | Nakamura | ................... 358/500 |
| 5,497,431 A | * | 3/1996 | Nakamura | ................... 382/162 |
| 6,034,759 A | * | 3/2000 | Enomoto | ..................... 382/171 |
| 6,072,526 A | * | 6/2000 | Hashimoto et al. | ...... 348/223.1 |
| 6,088,137 A | * | 7/2000 | Tomizawa | ................... 358/538 |
| 6,272,239 B1 | * | 8/2001 | Colla et al. | ................. 382/167 |
| 6,332,041 B1 | * | 12/2001 | Yoshida | ...................... 382/190 |
| 6,549,644 B1 | * | 4/2003 | Yamamoto | .................. 382/118 |

* cited by examiner

Primary Examiner—Jingge Wu
(74) Attorney, Agent, or Firm—Burns, Doane, Swecker & Mathis LLP

(57) ABSTRACT

Characteristics of a plurality of skin types have been classified, and skin areas are detected from image data according to the classification. The skin areas are extracted in two steps, first coarsely and next finely. Then, skin areas can be extracted at high speed. For each of the skin areas image data are corrected according to the characteristics of the skin area. Then, skin areas are corrected according to the skin type. Even when an image includes a plurality of persons having different skin characteristics, correction appropriate for each skin type is possible.

22 Claims, 6 Drawing Sheets

IMAGE PROCESSING FOR IMAGE CORRECTION

This application is based on application No. 11-183444 filed in Japan, the contents of which are hereby incorporated by reference.

BACKGROUND OF THE INVENTION

1. Field of the Invention

The present invention relates to image correction of digital image.

2. Description of Prior Art

When digital image data received from a digital camera or the like are corrected, if a person is included in the image, the skin color has to be corrected accurately because skin color is a memory color. In prior art image processing, skin area or person area is extracted generally by using color information. For example, in the skin image recognition described in Japanese Patent laid open Publication 6-309433/1994, skin area candidates are searched from LHC data converted from RGB data, and a histogram on lightness is obtained. Then, an indication on closeness to skin is calculated from the histogram, and skin areas are determined based on the indication. In hand recognition described in Japanese Patent laid open Publication 7-105371/1995, a skin pixel is detected in an image of hand when color components of the pixel are within a predetermined range, and a skin area is extracted in the image of hand. In skin area detection described in Japanese Patent laid open Publication 9-44670/1997, a histogram of hue converted from RGB data is obtained, and a face area is detected in a particular distribution range in the hue histogram. In person detection apparatus described in Japanese Patent laid open Publication 9-50528/1997, a face area is searched in RGB data, and a person area is divided to mosaics to extract a face area.

However, in the prior art image correction techniques, when skin color is extracted from the image and corrected, the image correction is performed on the entire image uniformly, and color correction is performed generally without limiting to skin. Therefore, when an image includes a plurality of persons having different skin characteristics, it is difficult to perform appropriate correction for each skin.

SUMMARY OF THE INVENTION

An object of the present invention is to provide appropriate image correction by taking each skin characteristic into account even when an image includes a plurality of persons having different skin characteristics.

Another object of the present invention is to provide image correction which can detect skin color fast in an image.

An advantage of the present invention is that even when an image includes a plurality of persons having different skin characteristics, correction appropriate for each skin type is possible.

Another advantage of the present invention is that skin areas can be extracted at high speed.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
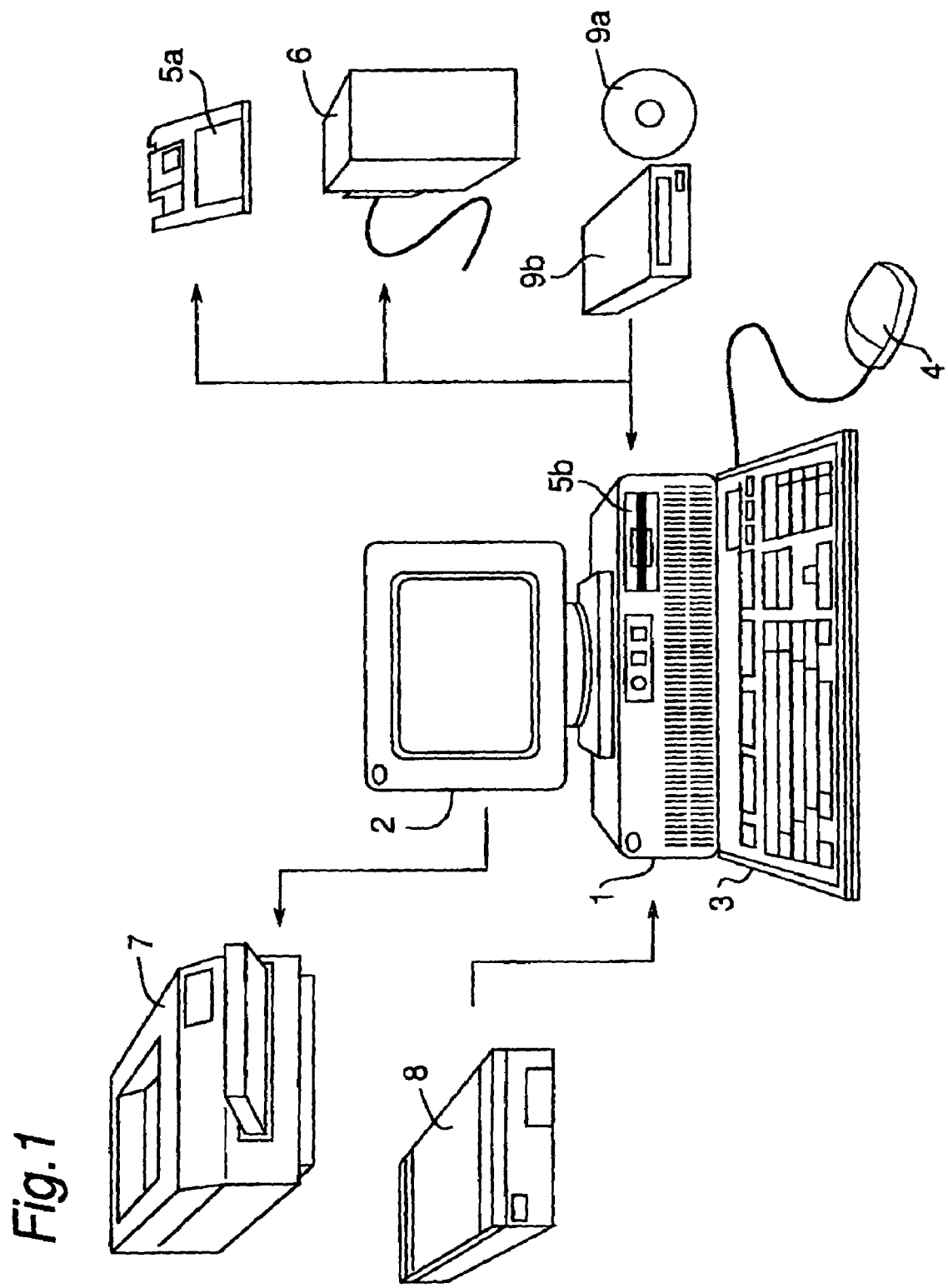
FIG. 1 is a diagram of an entire image processor.

Referring now to the drawings, wherein like reference characters designate like or corresponding parts throughout the several views, FIG. 1 shows an entire image processing apparatus according to a first embodiment of the invention. It has a controller (computer) 1 which controls the entire apparatus, as a central component. In FIG. 1, arrows show directions of data flow. A display device 2 displays various screens provided for operation or image processing as well as an image in a screen. A keyboard 3 and a mouse 4 are used for various inputs and instructions by a user. A flexible disk 5 and a hard disk 6 are storage media for storing, for example, image data, attribute information and programs. The apparatus has a flexible disk drive and a hard disk drive for accessing the flexible disk 5 and the hard disk 6. A printer 7 prints image data or the like on a paper. A scanner 8 reads image data of a document. A CD-ROM 9 is a storage medium for storing various data or programs, and the apparatus has a CD-ROM drive for accessing the CD-ROM 9. Programs explained later are read from an external recording medium such as a CD-ROM.

Figure 2:
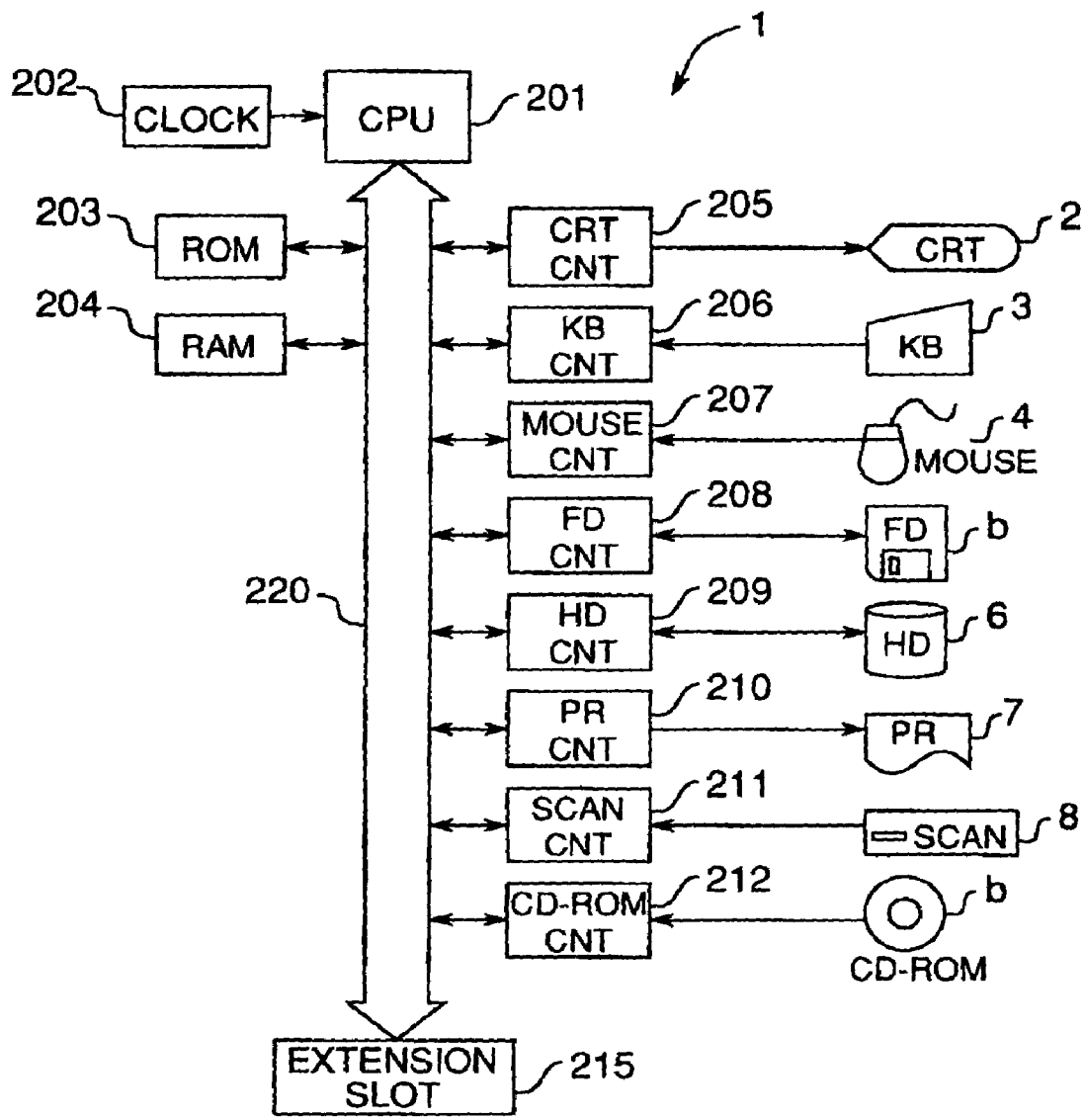
FIG. 2 is a block diagram of a controller and thereabout.

FIG. 2 is a block diagram of the controller 1 and thereabout. The controller 1 has a central processing unit (CPU) 210 connected via a bus 220 to a read-only-memory (ROM) 203 for storing various programs and a random access memory (RAM) for storing various data and programs. Further, it is also connected via the bus 220 to a display controller 205 for displaying images and characters in a screen of the display apparatus 2, a keyboard controller 206 for controlling key-input from the keyboard 3, a mouse controller for controlling an input from the mouse 4, a flexible disk controller 208 which controls the flexible disk drive, a hard disk controller 209 for controlling the hard disk 6, a printer controller 210 which controls outputs to the printer 7, a scanner controller 211 which controls the scanner 8, and a CD-ROM drive controller 212 which controls the CD-ROM drive. Further, in the controller, a clock circuit 202 generates various clock signals for operating the apparatus. Further, extension slots 215 are connected to the bus 220 for connecting various extension boards to which for example a SCSI board is connected for connecting a flexible disk drive, a hard disk drive, a scanner, a CD-ROM drive or the like. Further, it is also connected via an interface card to a network (web). In this apparatus, the flexible disk 5 and the hard disk 6 are used as storage media, but other medium such as a magneto-optical disk may also be used. The scanner 8 and the CD-ROM 9 are used for inputting image data, but another input devise such as a still video camera may also be used. The printer 7 is used as an output device, but a digital copying machine or the like may also be used.

In this apparatus, image data are corrected in an image correction routine which includes extraction and correction of skin color areas. When start of image correction is instructed by a user, the routine is evoked. The image correction routine further includes image file input/output processing, image data display processing, a graphic user interface processing for image correction operation, error processing in the graphic user interface processing, and resolution change processing, but they are not explained here.

In the image correction, even when an image includes a plurality of persons having different skin characteristics, skin is corrected by taking each skin characteristic into account. Various types of skin areas have been classified beforehand for each skin characteristic. When image data are received, skin areas are extracted from the image data according to the skin type, and the image data are corrected appropriately by taking the skin characteristics of skin areas into account.

Table 1 compiles correction for each skin type wherein skin type is classified into white, yellow and tan. In the case of white, hue histogram is extended to shift center of gravity in a direction of skin color of memory color (pink), and chroma histogram is extended in a direction of standard chroma. In the case of yellow, hue histogram is extended to shift center of gravity in a direction of skin color of memory color, and chroma histogram is extended in a direction of high chroma. In the case of tan, hue histogram is extended to shift center of gravity in a direction of skin color of memory color (orange), and chroma histogram is extended in a direction of low chroma. As explained above, skin types are classified, and skin image is corrected according to the characteristic of skin type by modifying the histograms. Then, even when an image includes different skin types, each skin type can be corrected appropriately.

TABLE 1

Image correction according to skin type

| Skin type | Correction | |
|---|---|---|
| | Hue | Chroma |
| White | Extend histogram to shift center of gravity in a direction of memory color (pink) | Shift center of gravity in a direction to standard chroma (center value of chroma), and extend histogram |
| Yellow | Extend histogram to shift center of gravity in a direction of memory color | Shift center of gravity in a direction to high chroma and extend histogram |
| Tan | Extend histogram to shift center of gravity in a direction of memory color (orange) | Shift center of gravity in a direction to low chroma and extend histogram |

Figure 3:
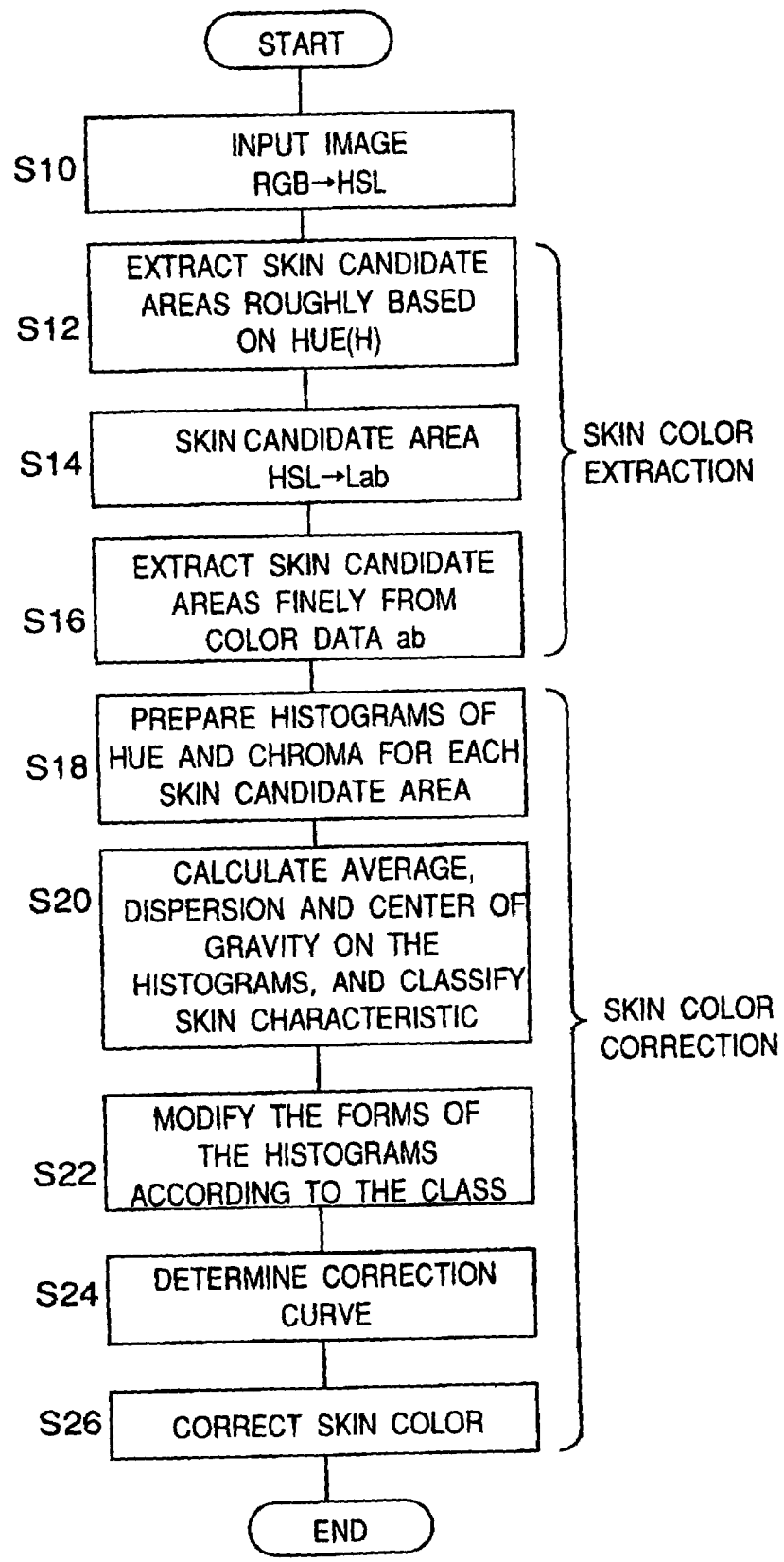
FIG. 3 is a general flowchart of skin color correction.

FIG. 3 shows a flowchart of skin correction in the image correction. First, skin color is extracted from input image data. The input image data is converted from RGB signals to HSL signals (step S10), and skin candidate areas are extracted roughly from the RGB signals of the input image data (step S12). Next, HSL signals in the extracted skin candidate areas are converted to Lab signals (step S14), and skin areas are extracted carefully from data of ab (hue) (step 516). Because skin is extracted in the above-mentioned two steps, skin areas can be extracted together from the image at high precision and at high speed, and the image extraction has no dropping out on skin area.

Next, skin is corrected. First, histograms of hue and chroma are prepared for each of the extracted skin areas (step S18). Next, an average, a dispersion and a center of gravity are calculated from the histograms and skin characteristic is classified based thereon (step S20), and the forms of histograms are modified (step S22). Next, a correction curve for correcting input data to generate output data is determined according to the adjusted histograms (step S24), and the skin color is corrected by using the correction curve (step S26).

Figure 4:
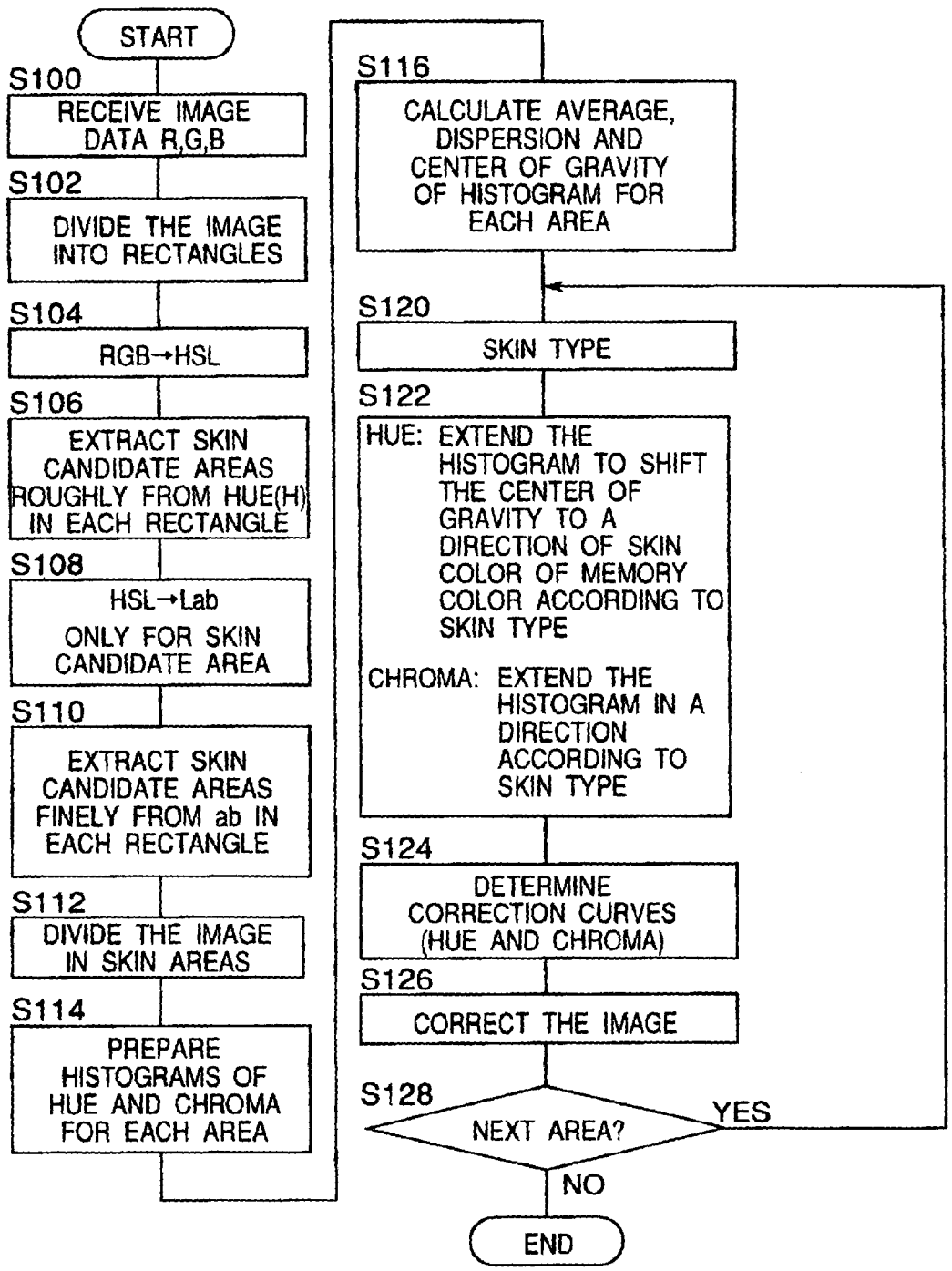
FIG. 4 is a flowchart of skin color correction.

FIG. 4 shows a flow chart of skin correction concretely. First, image data (RGB signals) are received (step S100), and the image data are divided into rectangles (or a mosaic image) (step S102). Next, the input RGB signals are converted to HSL signals (step S104).

Next, skin color is extracted from the image data. First, skin candidate areas are extracted coarsely from hue (H) signals for each rectangle (Step S106). In this extraction, a range of hue to be detected is limited, so as to detect generally all types of skin. However, skin type cannot be specified. Next, HSL signals are converted to Lab signals only on the extracted skin candidate areas (step S108). Next, the skin candidate areas are extracted finely according to the a, b signals for each rectangle (step S110). That is, skin type is specified from the signals ab to extract skin candidate areas. In this skin extraction, in the first step, the processing is simple and coarse, and in the second step, the processing is heavy but fine. Then, the extraction can be performed at high speed. Next, the images are divided into skin areas (step S112), wherein the skin candidate areas obtained in the unit of rectangle are integrated for each skin type specified above. In the integration, a differences of the a, b signal is compared between adjacent rectangles and compared with a threshold determined for skin type, and if the a, b signals are within the thresholds, the adjacent rectangles are integrated.

Next, skin is corrected. First, histograms of hue and chroma are prepared for each of the skin areas which have been extracted and integrated above (step S114). Next, in order to determine the skin characteristic, an average, a dispersion and center of gravity are calculated from the histograms (step S116). Next, processing shown in Table 1 is performed for each area. First, skin type is classified (step S120). Then, the histogram of hue is extended to shift the center of gravity in a direction of skin color of memory color according to the skin type, and the histogram of chroma is extended in a direction according to the skin type, based on the average, dispersion and center of gravity of the histograms (step S122). Next, correction curves are determined on hue and chroma (step S124), and skin image is corrected by using the correction curves (step S126). Next, it is decided whether a next area to be processed is remained (step S128). If there is a next area, the flow returns to step S116, and the above skin correction is repeated. If there is no next area, the processing is completed.

Figure 5:
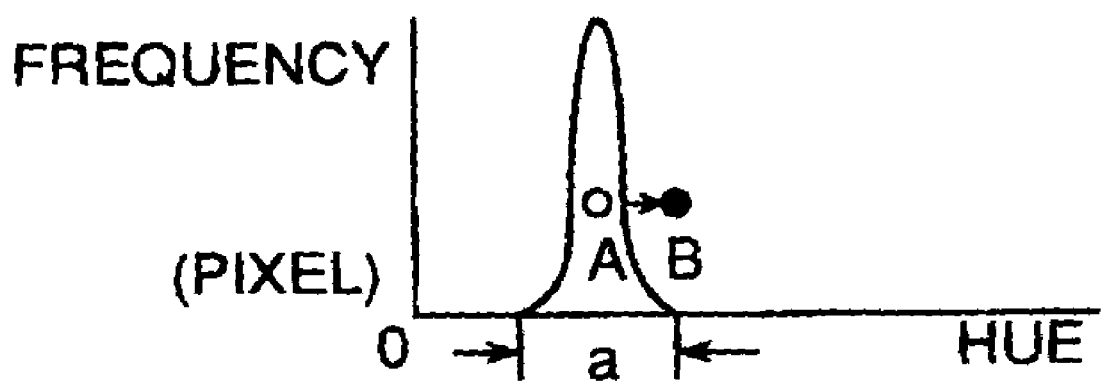
FIG. 5 is a diagram of an example of hue histogram concretely.
Figure 6:
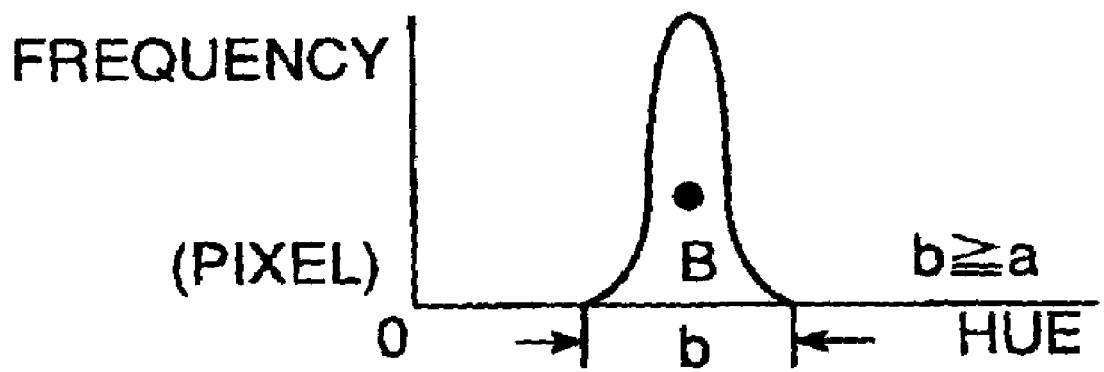
FIG. 6 is a diagram of an example of modification of the hue histogram.

An example of the processing on the histogram of hue is explained with reference to FIGS. 5 and 6. FIG. 5 shows a histogram of hue in a skin area. In the histogram, center of gravity is shifted from "A" (white circle) to "B" (black circle) of memory color of skin color according to skin type, and as shown in FIG. 6, the width "a" is increased to "b".

Figure 7:
FIG. 7 is a diagram of an example of chroma histogram.
Figure 8:
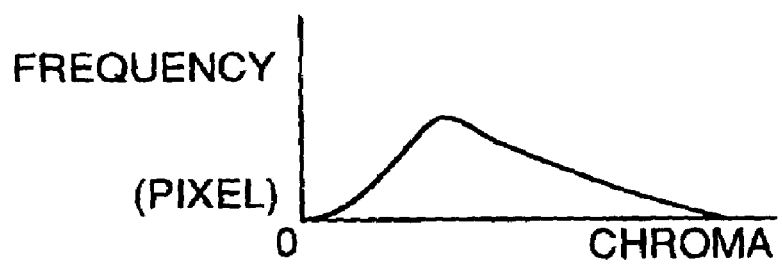
FIG. 8 is a diagram of an example of modification of the chroma histogram.

FIG. 7 shows a histogram of chroma for skin type of white in a skin area. As shown in FIG. 8, the histogram is subjected to the correction explained above with reference to Table 1, wherein the center of gravity is shifted in a direction of standard chroma (center of chroma) and the histogram is extended.

Figure 9:
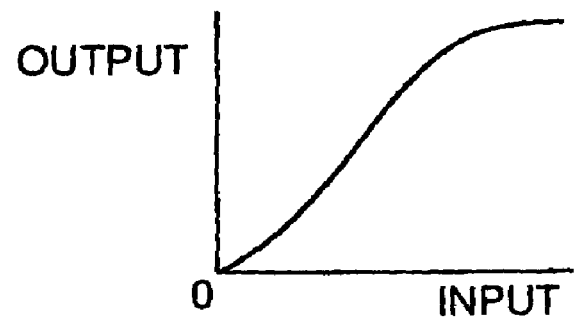
FIG. 9 is a diagram of an example of generation of correction curve.

With reference to the modification of the histogram, as shown in FIG. 9, a correction curve for correcting input data to output data is determined (as explained on step S124). The correction curve is prepared by accumulating the frequencies of the histogram of chroma from the low level to high level.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor, wherein characteristics of a plurality of skin colors are classified beforehand, comprising:
   an area extractor which extracts skin areas from input image data a decider which decides, among a plurality of different classifications, in which classification each of the extracted skin areas belong; and
   an image corrector which corrects image data of each of the skin areas extracted by said area extractor according to a correction method provided beforehand that corrects each one of the plurality of different classified skin areas differently according to which of the plurality of different classifications the skin area belongs.

2. The image processor according to claim 1, wherein said area extractor determines the characteristic of skin according to average, dispersion and center of gravity obtained from a histogram of image data of each of the skin areas.

3. The image processor according to claim 1, wherein said image corrector prepares a histogram of hue for each of the skin areas extracted by said image extractor, modifies the histogram to shift the center of gravity thereof to come close to center of gravity of a memory color of the skin color according to the characteristic of skin color of the each of the skin areas, generates a correction curve for correcting the image data according to the modified histogram, and corrects the image data in the skin area according to the correction curve.

4. The image processor according to claim 3, wherein said image corrector prepares a histogram of chroma for each the skin areas extracted by said image extractor, modifies the histogram according to the characteristic of skin, and generates a correction curve for the image data in the skin area.

5. The image processor according to claim 4, wherein when the skin areas are extracted from the input image data, said area extractor extracts skin candidate areas from image data, converts color specification system of the image data for each of the skin candidate areas and extracts skin areas from the skin candidate areas based on the image data in the color specification system.

6. The image processor according to claim 5, wherein said area extractor comprises a divider which divides the image data into rectangle areas, and an area integrator which integrates the rectangle areas for each of the characteristic when the skin areas are extracted, wherein said area integrator integrates adjacent pixels if difference in hue between adjacent pixels is within a threshold determined for each skin type.

7. The image processor according to claim 1, wherein said image corrector prepares a histogram of chroma for each of skin areas extracted by said image extractor, modifies the histogram according to the characteristic of skin, and generates a correction curve for correcting the image data.

8. The image processor according to claim 1, wherein when the skin areas are extracted from the input image data, said area extractor extracts skin candidate areas from image data, converts color specification system of the image data for each of the skin candidate areas and extracts skin areas from the skin candidate areas based on the image data in the color specification system.

9. The image processor according to claim 1, wherein said area extractor comprises a divider which divides the image data into rectangle areas, and an area integrator which integrates the rectangle areas for each of the characteristic when the skin areas are extracted, wherein said area integrator integrates adjacent pixels if difference in hue between adjacent pixels is within a threshold determined for each skin type.

10. An image processing method, wherein characteristics of a plurality of skin colors are classified beforehand, the method comprising the steps of:
    extracting skin areas from input image data;
    deciding which, among a plurality of different classifications, each of the extracted skin areas belongs; and
    correcting image data of each of the extracted skin areas according to one of a plurality of different correction methods provided beforehand that corrects each one of the plurality of different classified skin areas differently according to which of the plurality of different classifications the skin area belongs.

11. The image processing method according to claim 10, wherein said image correction step comprises the steps of:
    preparing a histogram of hue of each of the extracted skin areas;
    changing the histogram to shift the center of gravity thereof to come close to center of gravity of a memory color of the skin color according to the characteristic of skin color of the each of the skin areas;
    generating a correction curve for correcting the image data according to the modified histogram; and
    correcting the image data in the skin area according to the correction curve.

12. A computer-readable storage medium storing a computer program comprising the steps of:
    providing a plurality of classifications of characteristics, each classification corresponding to a plurality of skin colors;
    extracting skin areas from input image data;
    deciding which classification, among the plurality of different classifications, each of the extracted skin areas belong; and
    correcting image data of each of the extracted skin areas according to a correction method provided beforehand that corrects each one of the plurality of different classified skin areas differently according to which of the plurality of different classifications the skin area belongs to.

13. The computer-readable storage medium according to claim 12, wherein in said extracting step, the characteristic of skin is determined according to average, dispersion and center of gravity obtained from a histogram of image data of the skin area.

14. The computer-readable storage medium according to claim 12, wherein in said correcting step, a histogram of hue of the extracted skin area is prepared, the histogram is modified to shift the center of gravity thereof to come close to center of gravity of a memory color of the skin color according to the characteristic of skin color of each of the skin areas, a correction curve for image data is generated according to the modified histogram, and the image data in the skin area is corrected according to the correction curve.

15. The computer-readable storage medium according to claim 14, wherein in said correcting step, a histogram of chroma of each of the extracted skin areas is prepared, the histogram is extended according to the characteristic of skin, and a correction curve for the image data is generated.

16. The computer-readable storage medium according to claim 15, wherein when the skin areas are extracted from the input image data, skin candidate areas are extracted from image data, color specification system of the image data is converted for each of the skin candidate areas and skin areas are extracted from the extracted skin candidate areas based on the image data in the color specification system.

17. The computer-readable storage medium according to claim 16, wherein in said extracting step, the image data are divided into rectangle areas, and the rectangle areas are integrated for each of the characteristic when the skin areas are extracted, wherein adjacent pixels are integrated if difference in hue between adjacent pixels is within a threshold determined for each skin type.

18. The computer-readable storage medium according to claim 12, wherein in said correcting step, a histogram of chroma of each of the extracted skin areas is prepared, the histogram is modified according to the characteristic of skin, and a correction curve for the image data is generated.

19. The computer-readable storage medium according to claim 12, wherein when the skin areas are extracted from the input image data, skin candidate areas are extracted from image data, color specification system of the image data is converted for each of the skin candidate areas and skin areas are extracted from the extracted skin candidate areas based on the image data in the color specification system.

20. The computer-readable storage medium according to claim 12, wherein in said extracting step, the image data are divided into rectangle areas, and the rectangle areas are integrated for each of the characteristic when the skin areas are extracted, wherein adjacent pixels are integrated if difference in hue between adjacent pixels is within a threshold determined for each skin type.

21. An image processor comprising:
   an area extractor which extracts skin areas from input image data;
   a classifier which classifies each of the skin areas into one of a plurality of skin types according to characteristics of a plurality of skin colors; and
   an image corrector which differently corrects image data of each of the plurality of different classifications of the skin areas classified in the same skin type according to which of the plurality of different classifications the skin area belongs.

22. The image processor according to claim 1, wherein said area extractor firstly extracts skin candidate areas from image data of an entire area and secondly extracts skin areas from the image data in said skin candidate areas.

* * * * *